(12) United States Patent
Bunce et al.

(10) Patent No.: US 7,675,966 B2
(45) Date of Patent: Mar. 9, 2010

(54) ON-CHIP DETECTION AND MEASUREMENT OF DATA LOCK IN A HIGH-SPEED SERIAL DATA LINK

(75) Inventors: Robert M. Bunce, Hopewell Junction, NY (US); William R. Kelly, Verbank, NY (US); Kevin G. Kramer, Wappingers Falls, NY (US); Dinesh B. Nair, Cochin, IN (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 11/537,053

(22) Filed: Sep. 29, 2006

(65) Prior Publication Data

US 2008/0080603 A1    Apr. 3, 2008

(51) Int. Cl.
*H04B 3/46* (2006.01)
(52) U.S. Cl. ...................................... 375/224
(58) Field of Classification Search ............... 375/224, 375/225, 227, 228, 354, 356, 359, 363, 371, 375/373; 702/69; 713/500, 503
See application file for complete search history.

(56) References Cited

U.S. PATENT DOCUMENTS

| | | | |
|---|---|---|---|
| 5,180,933 A | 1/1993 | Krzyzanowski | |
| 5,694,440 A | 12/1997 | Kallman et al. | |
| 6,658,075 B1 | 12/2003 | Aftelak | |
| 6,785,354 B1 | 8/2004 | Dietrich | |
| 7,409,031 B1* | 8/2008 | Lee et al. | 375/376 |
| 2001/0033629 A1 | 10/2001 | Ito | |
| 2004/0252802 A1* | 12/2004 | Yamaguchi | 375/371 |
| 2005/0138375 A1* | 6/2005 | Sadjadi | 713/167 |
| 2005/0238129 A1 | 10/2005 | Ishida et al. | |
| 2007/0168770 A1* | 7/2007 | Fan et al. | 714/704 |

* cited by examiner

*Primary Examiner*—Sam K Ahn
(74) *Attorney, Agent, or Firm*—Cantor Colburn LLP; Mark McBurney

(57) ABSTRACT

A method for on-chip detection of data lock and measurement of data lock time in a high-speed serial data link, including: permitting one or more incoming data streams into the high-speed data link; establishing a pattern to be searched in the one or more incoming data streams; comparing patterns in the one or more incoming data streams to a programmable data pattern; holding a repetitive pattern of bits in the one or more incoming data streams by one or more programmable data pattern registers, wherein when one or more occurrences of a byte are detected, an appropriate bit in the one or more programmable data pattern registers is set to indicate the byte's relative position; and filtering false indications in the repetitive pattern by using a byte detection state machine, the state machine controlling and keeping track of a search progress.

6 Claims, 6 Drawing Sheets

ON-CHIP DETECTION AND MEASUREMENT OF DATA LOCK IN A HIGH-SPEED SERIAL DATA LINK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to high-speed serial data links, and particularly to a method for measuring a data lock time in high-speed serial data links.

2. Description of Background

Lock time is the time required for a serial data receiver to recognize and commence recovering clock and data from an incoming serial data stream within a specified bit error rate tolerance. Once a lock is achieved, parallel data serialization from the incoming stream is considered valid, and serial communications are established.

In circuits, such as Fabric Switches, where high-speed multiplexing between different serial data sources is critical, it is important to be able to efficiently measure the worst-case data lock time. In fact, at least one industry standard specifies a maximum lock time for compliant receivers. Customer logic is also dependent on data lock time and is generally delayed, usually by a much longer time than the maximum lock time, in order to ensure data lock has been achieved prior to recognizing valid communications.

However, data lock time is difficult to measure accurately. In traditional systems, a 2× oversampling of a serial bit stream is common in order to save power. Nevertheless, a 2× oversampling method results in data falsely appearing to be locked for perhaps hundreds of bit times as the clocking mechanism attempts to find a stable phase relationship. If the downstream logic erroneously commences to process this data, assuming a valid lock, corruption of the data is highly possible.

Although it is very useful to be able to accurately measure the maximum lock time, most traditional methods are fairly inaccurate. In general, given two independent or phase shifted serial data streams, multiplexed into a single serial link receiver input, lock time is measured by switching between the serial input streams and determining how long the receiver takes to output valid data from its new input. The multiplexing step, though challenging to perform, is generally accomplished by available off-the-shelf components. However, accurate and appropriate detection of valid data at the output of the serial link under test is quite difficult to achieve.

A significant amount of serial link testing involves the use of a BIT Error Rate Tester (BERT). This is a piece of equipment that produces a high fixed frequency or pseudo random serial data stream that is fed through a serial link under test and back to the BERT. The BERT then provides an error output, which indicates when the received data stream differs from what was transmitted. Nevertheless, the BERT is not very accurate in measuring data lock time because the BERT takes a significant amount of time to lock onto a new incoming data stream, thereby swamping the actual lock time delay with inherent equipment delays.

Another traditional method of measuring lock time requires the use of 8B/10B decoders to approximate a measurement. In this method, the incoming data streams are limited to valid 8B/10B encoded bytes. As in the first traditional method, the multiplexed data stream is fed through the serial link under test. The output is then passed through an 8B/10B decoder. Because the decoder detects 8B/10B protocol violations, its error output is examined to approximate the period where the serial link is not locked. By manually analyzing the error output data for periods where burst of bits occurred, lock time is then approximated. However, this second traditional method of measuring lock time has several disadvantages. These disadvantages include: (1) requiring significant and time consuming post processing of the output data, (2) the method is limited to valid 8B/10B coding, and (3) not all bit errors produce 8B/10B code violations.

Considering the limitations of the aforementioned methods, it is clear that there is a need for an efficient method for measuring data lock time.

SUMMARY OF THE INVENTION

The shortcomings of the prior art are overcome and additional advantages are provided through the provision of a method for on-chip detection of data lock and measurement of data lock time in a high-speed serial data link, the method comprising: permitting one or more incoming data streams into the high-speed data link, each of the one or more incoming data streams having a plurality of bits; establishing a pattern to be searched in the one or more incoming data streams; comparing patterns in the one or more incoming data streams to a programmable data pattern; holding a repetitive pattern of bits in the one or more incoming data streams by one or more programmable data pattern registers, wherein when one or more occurrences of a byte are detected, an appropriate bit in the one or more programmable data pattern registers is set to indicate the byte's relative position; and filtering false indications in the repetitive pattern by using a byte detection state machine, the state machine controlling and keeping track of a search progress and maintaining a counter for a number of successive groups of bytes' correctly matched.

The shortcomings of the prior art are overcome and additional advantages are provided through the provision of a system for on-chip detection of data lock and measurement of data lock time in a high-speed serial data link, the system comprising: a network; and a host system in communication with the network, the host system including software to implement a method comprising: permitting one or more incoming data streams into the high-speed data link, each of the one or more incoming data streams having a plurality of bits; establishing a pattern to be searched in the one or more incoming data streams; comparing patterns in the one or more incoming data streams to a programmable data pattern; holding a repetitive pattern of bits in the one or more incoming data streams by one or more programmable data pattern registers, wherein when one or more occurrences of a byte are detected, an appropriate bit in the one or more programmable data pattern registers is set to indicate the byte's relative position; and filtering false indications in the repetitive pattern by using a byte detection state machine, the state machine controlling and keeping track of a search progress and maintaining a counter for a number of successive groups of bytes' correctly matched.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for an efficient method for measuring data lock time in high-speed serial data links.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

One aspect of the exemplary embodiments is a method for measuring data lock time in high-speed serial data links.

The exemplary embodiments of the present invention resolve many of the limitations of external data lock detection and measurement methods. The exemplary embodiments allow for serial data lock to be detected on a chip and filter out false indications through the use of a byte detection state machine and a programmable threshold value.

The exemplary embodiments involve establishing a pattern to be observed in the incoming data stream. This pattern is an arbitrary N-bit pattern (where N=40 in an exemplary implementation), or any standard PRBS (Pseudo Random Bit Sequence) pattern (PRBS7, PRBS23, PRBS31 in an exemplary implementation). For arbitrary patterns, the pattern is divided into smaller groups of bits, and incoming data is searched for a matching set. When a matching set is found, the relative positions of the pattern are preserved and valid preceding bit groups are also identified. Furthermore, subsequent incoming data is searched for successive bits in the search pattern. A state machine controls and keeps track of the search progress and maintains a counter for the number of successive groups correctly matched.

For PRBS patterns, the incoming data is sampled and used as the seed for the internal PRBS generator, which then produces the next expected data to be compared with subsequent input data. A state machine controls the seed, generate, and check sequences, and a counter tracks the number of successful matches. When errors are detected, the state machine returns to the seed process and continues the process. In each case, once the counter reaches the programmable threshold value, lock is indicated as on or off chip.

Figure 1:
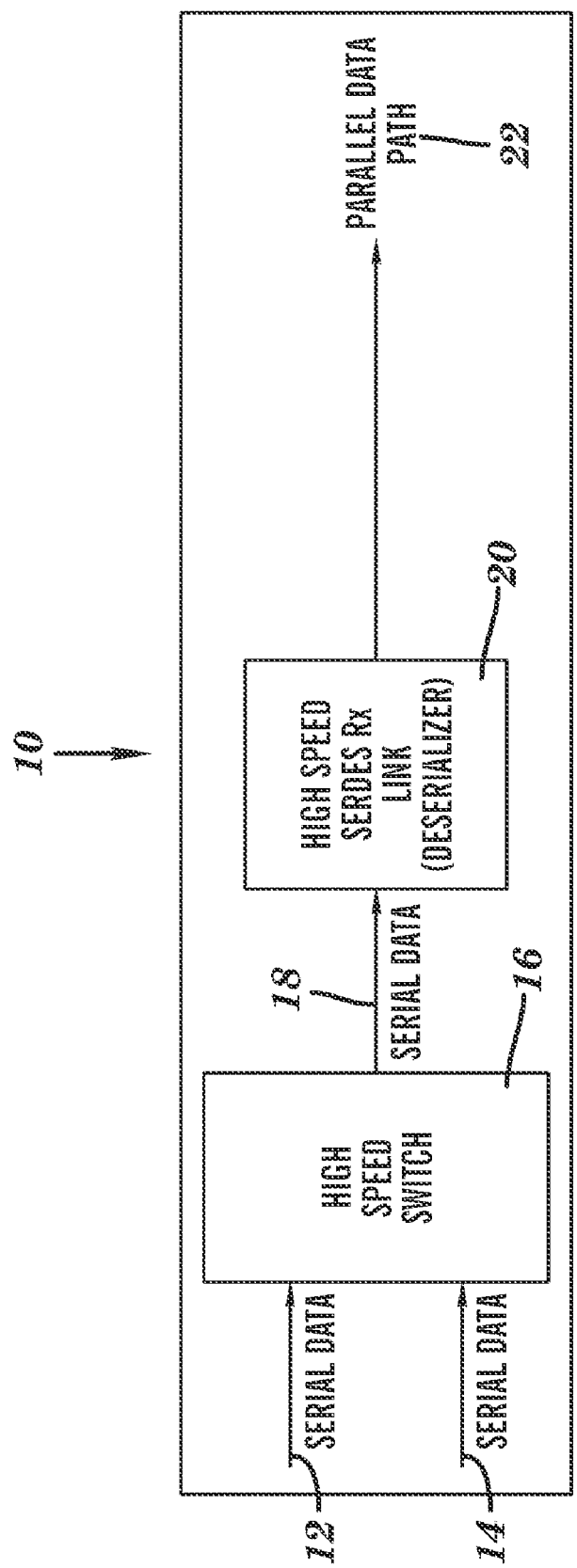
FIG. 1 illustrates a schematic block diagram of one example of a multiplexed serial data stream according to the exemplary embodiments of the present invention.

Referring to FIG. 1, one example of a multiplexed serial data stream according to the exemplary embodiments of the present invention is illustrated. In FIG. 1, two independent or phase shifted serial data streams are multiplexed (on or off chip) and fed into a single serial link receiver input. The multiplexed serial data stream 10 includes two serial data streams 12, 14, fed to a high-speed switch 16 that outputs a serial data stream 18 fed into a high-speed link 20 (or deserializer). The high-speed link 20 outputs a parallel data path signal 22. Once, deserialized in the receiver, the data is fed to a parallel data FIFO (First Input/First Output) or other logic, for continued processing, as well as to a Snapshot Register 30 shown in FIG. 2.

Figure 2:
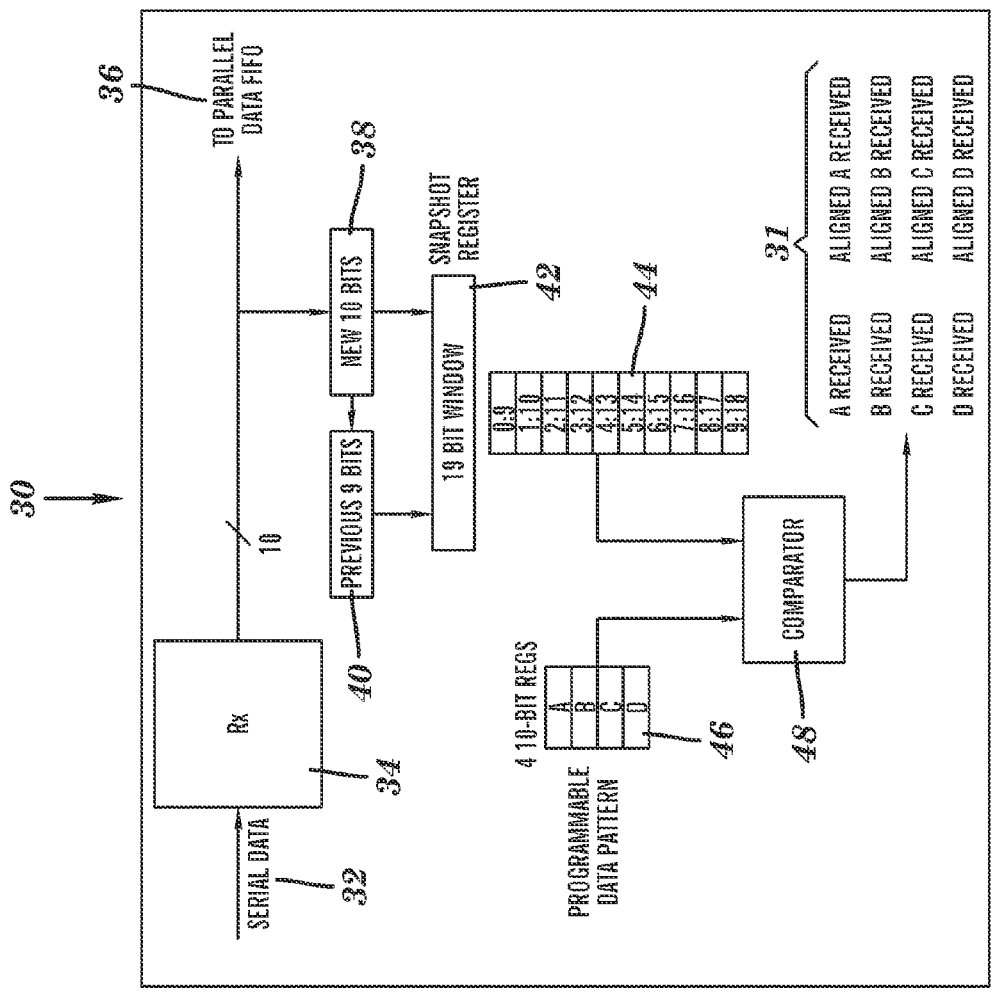
FIG. 2 illustrates a schematic block diagram of one example of a serial link input and pattern comparison mechanism according to the exemplary embodiments of the present invention.

Referring to FIG. 2, one example of a serial link input and pattern comparison mechanism according to the exemplary embodiments of the present invention is illustrated. The Snapshot Register 30 retains a portion of the previous parallel data, as well as new incoming data, for comparison to a programmable data pattern stored separately. The programmable data pattern registers, totaling 40 bits in an exemplary implementation, holds the repetitive pattern of bits expected in the incoming data. Also, the Snapshot Register 30 is updated at the parallel data rate. The serial data 32 is received by the deserializer 34, which outputs the serial data 32 as parallel FIFO data 36. The process then flows to a "new 10 bits" block 38, a "previous 9 bits" block 40, a "19-bit window" block 42, and a bit stack 44. The bit stack 44 and the "programmable data pattern" block 46 feed the comparator 48 with bit patterns labeled A, B, C, and D. Therefore, each time the Snapshot Register 30 is updated, the logic searches the current snapshot for any of the four 10-bit patterns labeled A, B, C, and D. The 10-bit bytes may be aligned anywhere within the Snapshot Register 30 as long as all 10 bits are present in order. When one or more occurrences of bytes A, B, C, and/or D are found, the appropriate bit in a pattern match register is set to indicate the bytes relative positions. This information is then fed into a state machine that tracks consecutive bytes. Also, selected pattern match data is preserved for several cycles. The output 31 of the comparator 48 is an acknowledgment that one of the four 10-bit patterns labeled A, B, C, and D has been received. An additional set of outputs indicate if this newest byte is aligned to previously received bytes that match the programmable data pattern.

Figure 3:
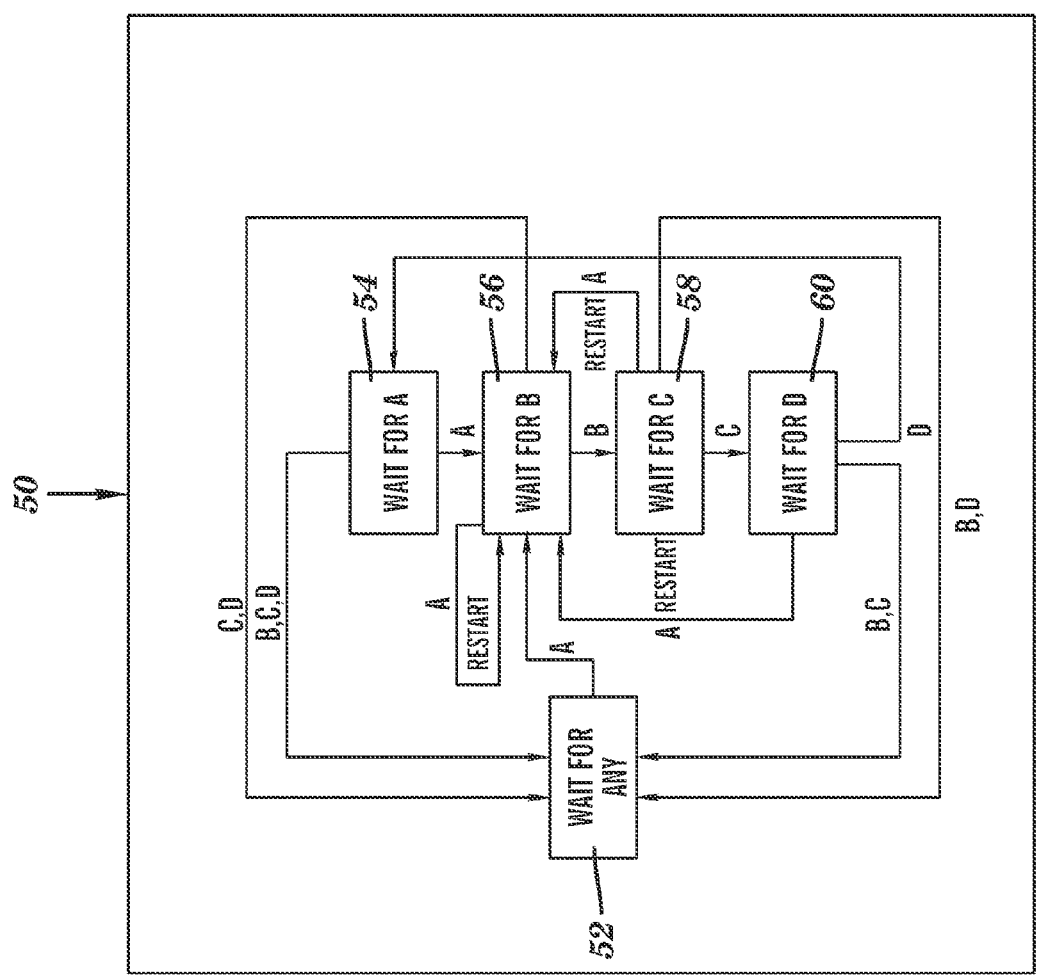
FIG. 3 illustrates one example of a state machine according to the exemplary embodiments of the present invention.

Referring to FIG. 3, one example of a state machine according to the exemplary embodiments of the present invention is illustrated. FIG. 3 illustrates a simplified view of the byte tracking state machine 50. The state machine includes a wait for any state 52, a wait for an A state 54, a wait for a B state 56, a wait for a C state 58, and a wait for a D state 60. Initially, the state machine 50 is in an idle state and it waits for recognition of the 10-bit pattern designated as Byte A. When one or more instances of Byte A have been recognized in a snapshot, the state machine looks at the preserved match data to determine if properly aligned Bytes D, C, and B had been received in the appropriate cycles immediately previous to the current cycle. A valid byte counter is updated accordingly, and the state machine then looks for a subsequent byte on a proper boundary in the next cycle. As subsequent bytes in the pattern, correctly aligned, are detected in successive cycles, the valid byte counter is incremented. Any deviation from the pattern results in resetting the counter and restarting the state machine. When an expected byte is not detected, the state machine is careful in detecting any valid bytes that have been received in the current window so that every correct byte in a new pattern is recognized and counted.

Figure 4:
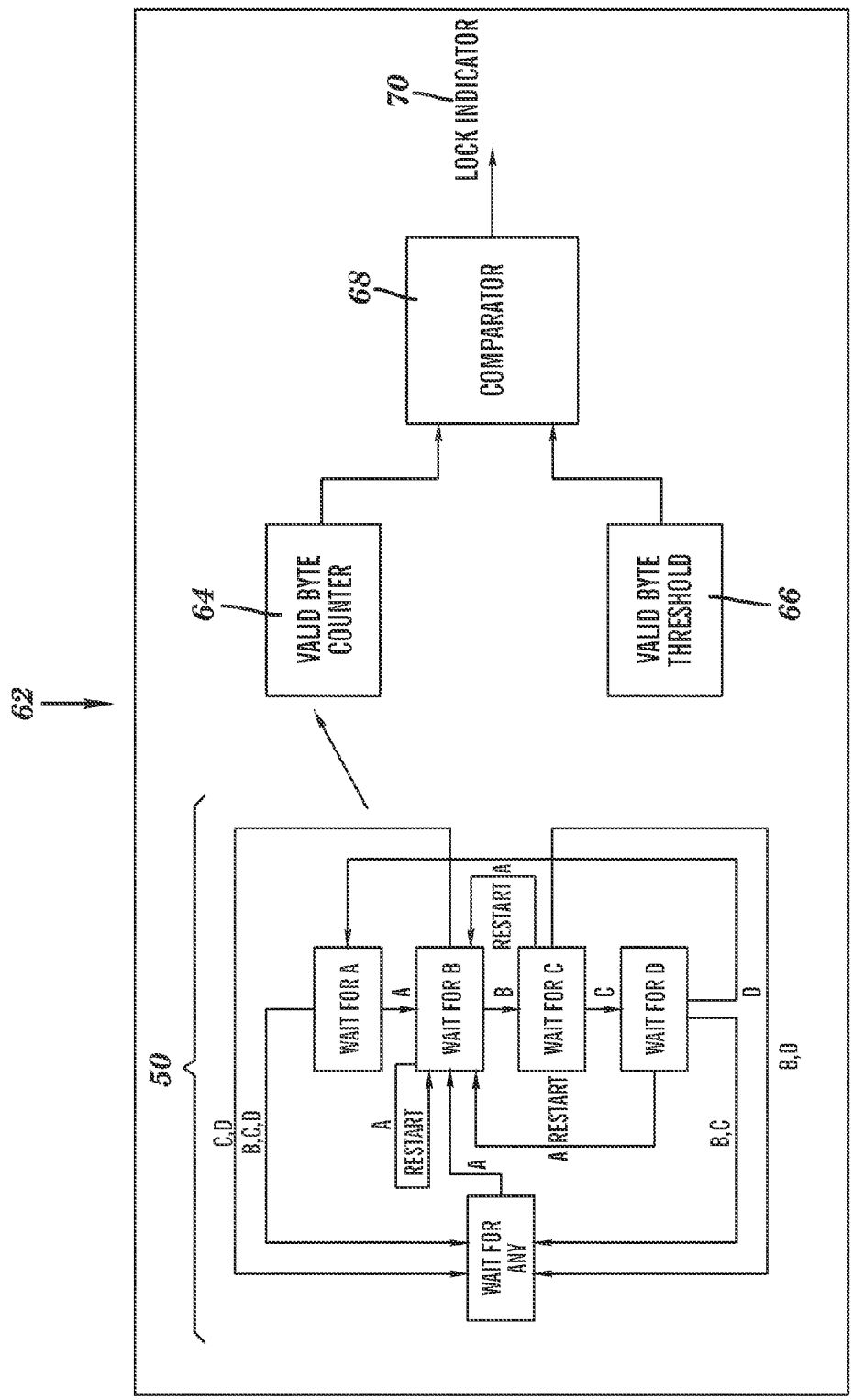
FIG. 4 illustrates one example of a valid byte count comparison to a threshold valid byte according to the exemplary embodiments of the present invention.

Referring to FIG. 4, one example of a valid byte count comparison to a threshold valid byte system 62 according to the exemplary embodiments of the present invention is illustrated. FIG. 4 illustrates the byte tracking state machine 50 of FIG. 3, the output of which enters a valid byte counter block 64. The output of the valid byte counter block 64 is fed into a comparator 68. The comparator is also fed with a valid byte threshold value 66. The comparator 68 compares the valid byte counter bytes 64 with the valid byte threshold 66. The output of the comparator 68 is a lock indicator value 70. Therefore, the programmable valid byte threshold 66 register is loaded with a threshold value indicating the number of valid bytes required in order for a link to be considered "locked" onto incoming serial data. When the valid byte counter 64 reaches the programmed threshold value in block 66, the comparator 68 outputs the lock indicator 70. Any subsequent byte that deviates from the current pattern or alignment causes the lock indicator 70 to be de-asserted. With the lock indicator 70 signal fed off-chip, lock time may be observed on any scope, and is the elapsed time while the lock indicator 70 is de-asserted less than the programmed lock threshold value in block 66.

Figure 5:
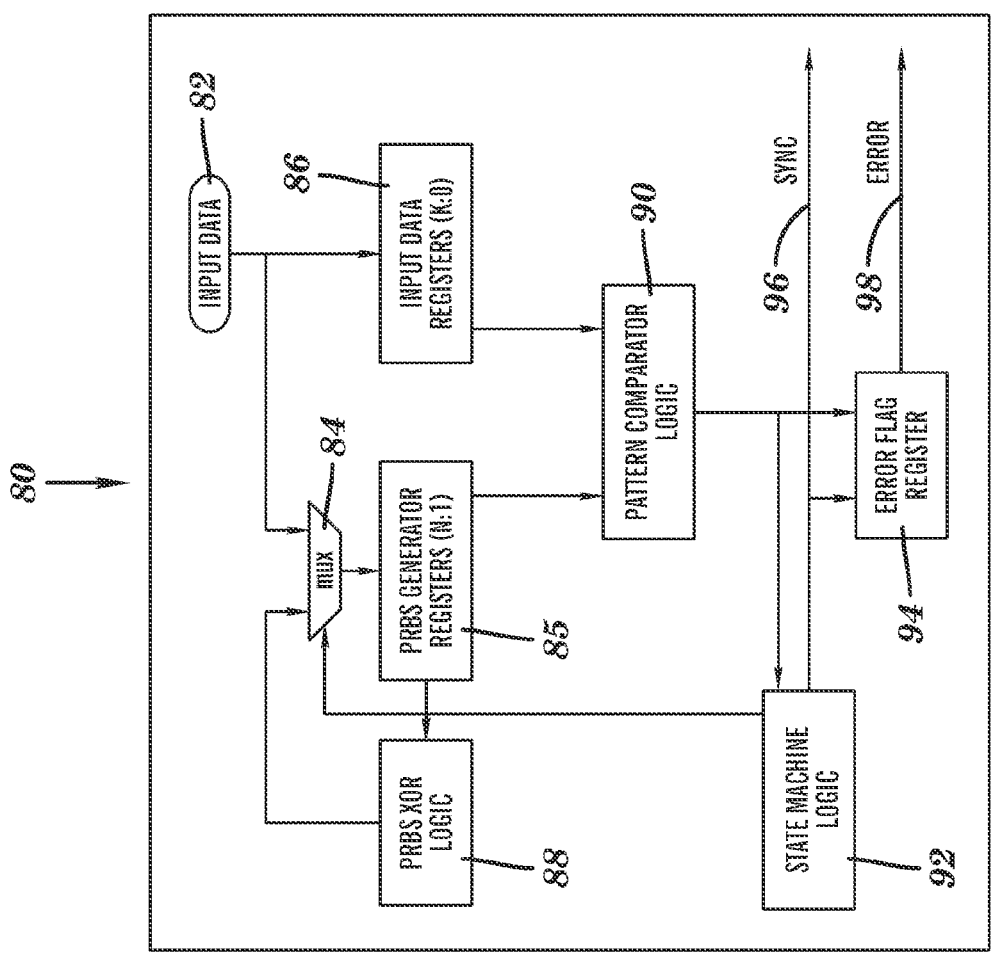
FIG. 5 illustrates one example of a PRBS (Pseudo Random Bit Sequence) generator/Error Checker according to the exemplary embodiments of the present invention.

Referring to FIG. 5, one example of a PRBS (Pseudo Random Bit Sequence) generator/Error Checker according to the exemplary embodiments of the present invention is illustrated. In some applications it is necessary to measure lock time to a standard data pattern such as a PRBS sequence, where the pattern length is too long to be implemented as described in FIG. 4. Instead, generator logic for the specified pattern is implemented as shown in FIG. 5, which receives its input data from the deserializer 34 shown in FIG. 2. The generator is controlled by the state machine shown in FIG. 6 described below, which allows the generator to be seeded by the incoming data stream, thus enabling rapid synchronization of the generator to the incoming data. The PRBS generator 80 includes input data 82 fed into input data registers 86 and into a multiplexer 84. The multiplexer 84 is also fed with state machine logic 92 and PRBS XOR logic 88. The output of the multiplexer 84 flows to the PRBS generator registers 85, which feed their output to a pattern comparator logic 90. The pattern comparator logic 90 feeds its output to the state machine logic 92 and to the error flag register 94. The state machine logic 92 outputs a signal SYNC 96 and the error flag register outputs an ERROR signal 98.

Figure 6:
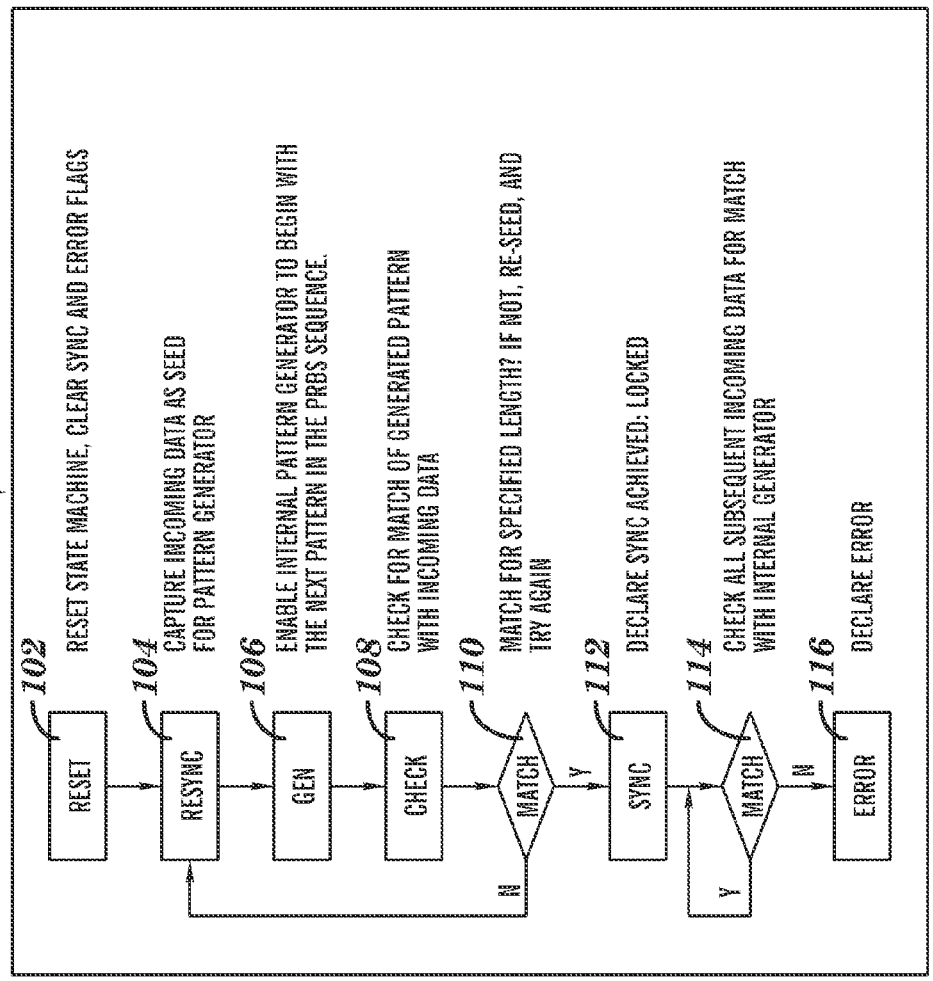
FIG. 6 illustrates one example of a flowchart depicting a process flow for a PRBS Seed/Lock State machine according to the exemplary embodiments of the present invention.

Referring to FIG. 6, one example of a flowchart depicting a process flow for a PRBS Seed/Lock State machine according to the exemplary embodiments of the present invention is illustrated. The flowchart depicting a process flow for a PRBS Seed/Lock State machine 100 describes the following steps. In step 102, a reset operation occurs where the state machine is reset, the sync is cleared, and error flags are denoted. In step 104, a re-sync operation occurs, where the incoming data is captured as seeds for the pattern generator. In step 106, a pattern generation operation occurs, where the internal pattern generator begins with the next pattern in the PRBS sequence. In step 108, a check operation occurs, where a check is performed for determining if a match of the generated pattern and the incoming data occurs. In step 110 it is determined if there is a match. If there is no match, the process flows back to step 102. If a match does occur, the process flows to step 112. In step 112, a sync operation occurs, where sync achieved is declared and the data lock is deemed "locked." In step 114, another match is determined, where all subsequent incoming data for a match is checked by the internal generator. If a match does not occur, the process flows to step 116. In step 116, the process declares an error and the data lock is deemed "unlocked."

Therefore, the advantages of the exemplary embodiments of the present invention include: (1) the elimination of the need for external circuitry, (2) the elimination of extensive data post-processing, (3) the data patterns are not limited to a specific encoding domain (e.g., 8B/10B), (4) a simple lock output allows the measurement process to run indefinitely, thus enabling detection of subtle pattern sensitivities in achieving a lock, (5) the ability to tune the programmable lock detect threshold in order to eliminate false lock indications, and (6) provide unfiltered accuracy of data lock time that is within 18 bit times for an implemented solution of the exemplary embodiment.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for on-chip detection of data lock and measurement of data lock time in a high-speed serial data link, the method comprising:

permitting one or more incoming data streams into the high-speed data link, each of the one or more incoming data streams having a plurality of bits;

establishing a pattern to be searched in the one or more incoming data streams;

comparing patterns in the one or more incoming data streams to a programmable data pattern to detect a data lock state and data lock time of the high-speed serial data link;

holding a repetitive pattern of bits in the one or more incoming data streams by one or more programmable data pattern registers, wherein when one or more occurrences of a byte are detected, an appropriate bit in the one or more programmable data pattern registers is set to indicate the byte's relative position; and filtering false indications in the repetitive pattern by using a byte detection state machine, the state machine controlling and keeping track of a search progress and maintaining a counter for a number of successive groups of bytes correctly matched.

2. The method of claim 1, wherein the pattern to be searched is an arbitrary N-bit pattern, wherein N is an integer, the arbitrary pattern being divided into one or more groups of bits, where the one or more incoming data streams are searched for a matching set of bits.

3. The method of claim 2, wherein relative positions of the pattern to be searched are preserved and valid preceding bit groups are identified whenever the matching set is detected.

4. The method of claim 1, wherein the pattern to be searched is a Pseudo Random Bit Sequence (PRBS) bit pattern, where the one or more incoming data streams are sampled and used as a seed for an internal PRBS generator that produces a next expected data to be compared with subsequent input data streams.

5. The method of claim 1, wherein the programmable data pattern registers at least a total of 40-bits.

6. A method for on-chip detection of data lock and measurement of data lock time in a high-speed serial data link, the method comprising:

resetting a state machine;

capturing incoming data streams as a seed for a pattern generator;

enabling the pattern generator to commence with a next pattern in a Pseudo Random Bit Sequence (PRBS) sequence;

checking for a match between a generated pattern and the incoming data streams;

determining whether the match has been detected for a predetermined length of the incoming data streams to detect data lock time of the high-speed serial data link;

declaring a data lock state of the high-speed serial data link when the match has been detected; and checking subsequent incoming data streams for matches between the subsequent incoming data streams and the pattern generator.

* * * * *